United States Patent Office 3,333,664
Patented Aug. 1, 1967

3,333,664
CLUTCH THROW-OUT BEARING
Edward G. Chapaitis, Detroit, Mich., assignor to Ford Motor Company, Dearborn, Mich., a corporation of Delaware
Filed Dec. 10, 1965, Ser. No. 512,963
9 Claims. (Cl. 192—98)

ABSTRACT OF THE DISCLOSURE

A resilient clutch release bearing mount having relatively movable cooperating curved surfaces permitting the clutch release bearing to align itself with the plane of the clutch release fingers.

---

The present invention relates generally to clutch constructions for automobiles, and more particularly to the construction of the clutch release bearing assembly.

Manually operated clutches for standard transmissions are often subjected to certain undesirable characteristics such as chatter and shudder. These can occur upon engagement or disengagement of the clutch at the moment when the pressure plate is just coming into contact with the clutch disc. This is often the result of misalignment of the parts which, in turn, is the result of manufacturing tolerances.

The conventional clutch has a flywheel with a cover secured to it. A pressure plate is movably connected to the cover and is adapted to engage a clutch disc and to force the disc into engagement with the flywheel. The pressure plate is controlled by a plurality of levers which act as fingers. One end of the levers engage the pressure plate and the other end engage a release or throw out bearing. The levers are pivotally supported on the clutch cover. Due to unavoidable manufacturing tolerances, the tips of the levers may not reside in a plane that is parallel to the engaging face of the release bearing. Thus, when the release bearing moves toward the flywheel to release the clutch, it will come into contact with the levers one at a time and, consequently, one portion of the pressure plate will be moved away from the clutch disc before another portion.

In view of the problems presented by clutches constructed according to the prior art, it is an object of the present invention to provide a clutch in which the release bearing has a self-centering feature and is adapted to engage the clutch release levers and to move them in unison even though the levers may not be arranged in the correct plane.

The many objects and advantages of the present invention may become apparent upon consideration of the following description and the accompanying drawings, in which:

FIGURE 4 is a sectional view taken along section lines 4—4 of FIGURE 3.

Figure 1:
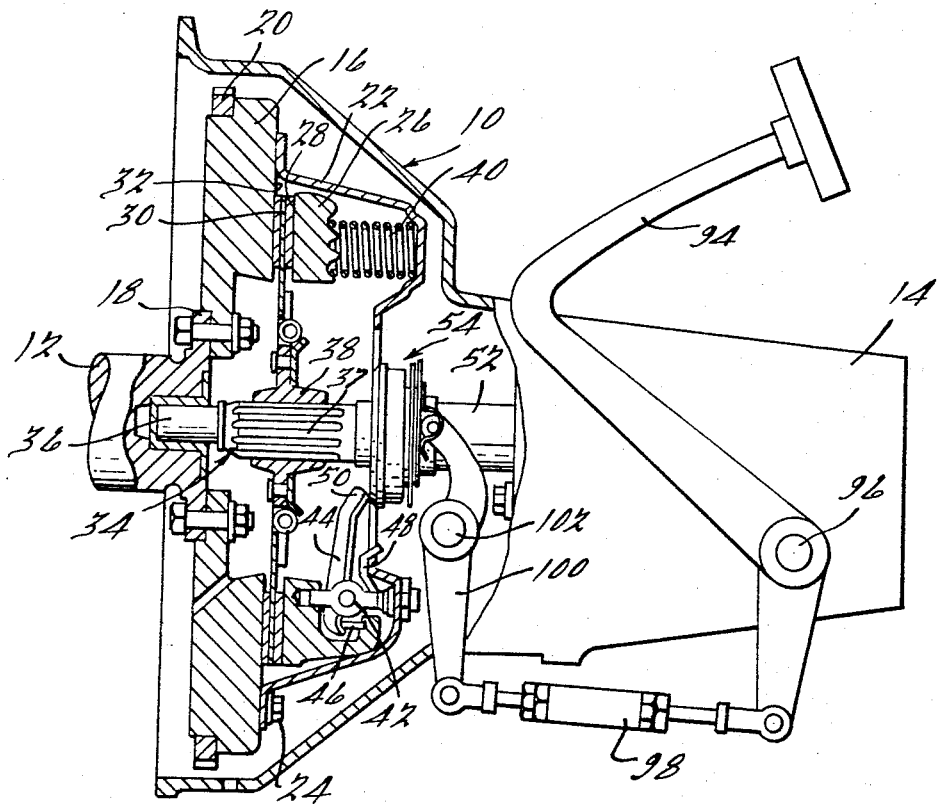
FIGURE 1 is a side elevational view partly in section of a clutch constructed in accordance with the present invention.
Figure 2:
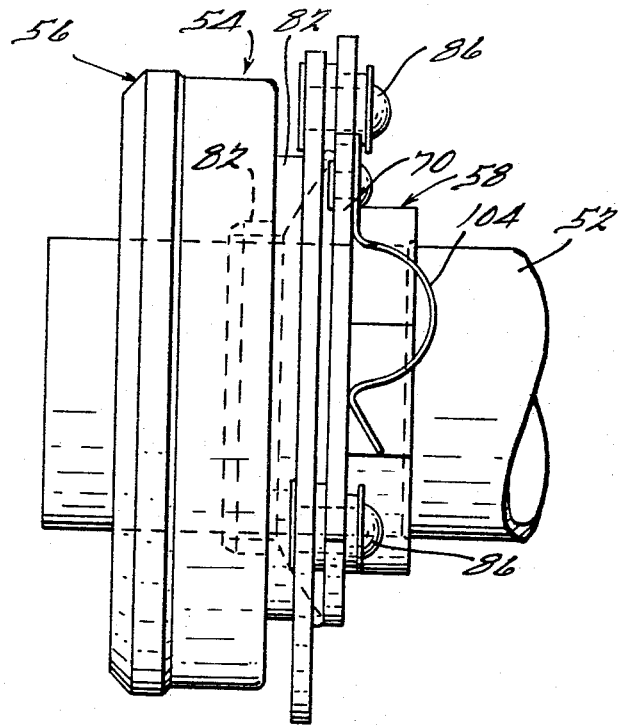
FIGURE 2 is an enlarged view in side elevation of the release bearing assembly.
Figure 3:
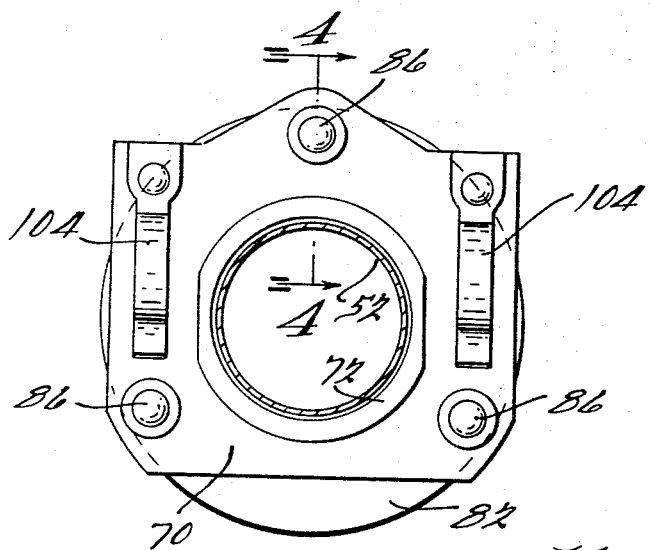
FIGURE 3 is an end view of the bearing assembly of FIGURE 2.

Referring now to the drawings for a more detailed understanding of this invention, FIGURE 1 discloses a clutch assembly 10 that is adapted for use in a motor vehicle. The clutch 10 is used to control the transmission of driving torque from an engine output shaft 12 to a change speed gear unit 14.

The clutch assembly includes a flywheel 16 that is bolted to the flanged end 18 of the engine output shaft 12. A ring gear 20 is secured to the periphery of the flywheel 16 and is adapted to be engaged by a starter motor. A clutch cover 22 is secured to the flywheel 16 by a circumferentially arranged series of bolts, such as bolt 24. A pressure plate 26 is located within the cover 22 and has a flat face 28 to engage one side of a clutch disc 30. The other side of the disc 30 engages the end face 32 of the flywheel 16.

A clutch output shaft 34 has a front end 36 piloted on the end of the output shaft 12 of the engine. Shaft 34 has a spline portion 37 that engages the internally splined hub 38 of the clutch disc 30.

The pressure plate 26 is urged into engagement with the clutch disc 30 by a circumferential series of pressure plate springs 40. Three fulcrum posts 42 are rigidly secured to the cover 22 and each pivotally supports a clutch release lever 44. The outer end of the levers 44 engage the pressure plate 26 by means of an intermediate link 46. A mouse trap spring 48 urges the inner tips 50 of the clutch release levers 44 in a left-hand or counterclockwise direction as viewed in FIGURE 1. The springs 48 maintain the levers 44 in engagement with the links 46 and function as antirattle devices.

A tubular bearing retainer 52 is supported within the unit and it, in turn, slidably supports a clutch release bearing assembly 54. Referring to FIGURE 4, it will be noted that the assembly 54 includes a thrust bearing 56 and a bearing support 58.

The thrust bearing 56 includes a sheet metal cover 60 that retains a pair of bearing races 62 and 64. A series of ball bearings 66 are retained between the bearing races 62, 64. The exposed face 65 of race 64 is adapted to engage the tips 50 of the clutch release levers 44. The inner race 62 is engaged by the assembly 58. A grease seal 68 is interposed between the thrust bearing 66 and the bearing retainer 52.

The bearing support 58 includes a first member 70 having a hub portion 72 that is slidably supported on the tubular bearing retainer 52. An O-ring grease seal 74 is interposed between the hub 72 and the retainer 52. A radial flange 76 extends outwardly from the hub 72. A series of three apertures 78 are provided about the flange 76 and each receives a hat-shaped rubber grommet 80.

A second member 82 of the bearing support 58 assembly has a radial flange 84 juxtaposed to the flange 76. A rivet 86 extends through each of the three rubber grommets 80 and secures the first and second members 70 and 82 together. The second support element 82 is provided with a shoulder 88 for supporting the race 62 of the bearing assembly 56.

The first support member 70 is machined to have a convex surface 90 that is positioned in face-to-face relationship with a concave spherical surface 92 formed on the second support member 82.

A clutch pedal 94 is pivotally supported at 96 on the transmission 14. The lower end of the pedal 94 is connected by a link 98 to an actuating lever 100 that is pivoted at 102 on the housing of the clutch 10. The upper end of the lever 100 is bifurcated to provide a pair of arms which straddle the tubular retainer 52. These arms are connected to the release bearing assembly 54 by spring clips 104.

The clutch assembly in FIGURE 1 is normally in engagement for the transmission of torque from the shaft 12 to the transmission 14. This occurs because the springs 40 force the pressure plate 26 against the disc 30 and it, in turn, against the flywheel surface 42. Under these circumstances, the flywheel 16, cover 22, pressure plate 26 and disc 30 rotate as a unit so that shaft 12 is in driving engagement with shaft 34.

When the clutch pedal 94 is pushed downwardly, both it and the lever 100 are moved in a counterclockwise direction. This movement is transmitted against the right-hand end of the bearing support assembly 58 and the thrust bearing assembly 56 moves to the left sliding along the tubular member 52. Leftward movement of the bearing 56 forces the plurality of release levers 44 to rotate about the fulcrum supports 42 and to push the pressure plate 26 against the force of the spring 40 away from the disc 30.

The tips 50 of the levers 44 may not reside in a plane parallel to the thrust bearing 56. In prior art structures when the tips 50 reside in a plane that is not in alignment with the end face of the thrust bearing, the pressure plate will not lift off of the clutch disc in an even manner and chattering will result. The present invention provides a self-centering feature for moving the levers 44 conjointly rather than in a haphazard manner.

By providing a pair of support elements 70 and 82 that are flexibly connected to the rubber grommets 80, the clutch release bearing assembly 56 is movable upon contact with the tips 50 of the lever 40. The end face 65 of the outer race 64 will be permitted to center itself against the tips 50 before the force necessary to pivot levers 44 and disengage the clutch is transmitted. The spherical surfaces 90 and 92 of the first and second support members 70, 82 are in bearing engagement when force is transmitted so that the two members may move relative to each other the slight amount necessary for the bearing assembly 56 to move the tips 50 in unison.

With a construction according to this invention, the levers 44 will be moved together rather than having one lever pivoted by the release bearing prior to its engagement with another lever. Because the levers are moved together, the pressure plate 26 will move away from the disc smoothly and evenly to prevent chatter.

An additional feature of the present invention is provided by the grease seals 74 and 68 and a third seal 106 spaced outwardly of the spherical surfaces 90, 92. These seals provide for the retention of lubricant within the thrust bearing 56 and on bearing surfaces 90 and 92. This retention of lubricant leads to a longer bearing life as well as improved clutch operation.

The foregoing description presents the presently preferred embodiment of this invention. Alterations and modifications of this embodiment can be made which will come within the scope and spirit of the following claims.

I claim:
1. A clutch assembly having a flywheel,
a cover secured to said flywheel,
a pressure plate movably connected to said cover,
a clutch disc interposed between said flywheel and said pressure plate,
a plurality of release levers pivotally connected to said cover and to said pressure plate,
said release levers extending radially inwardly,
a bearing having a surface adapted to engage said release levers,
a bearing support member,
flexible means connecting said bearing support member to said bearing and constructed to support said bearing for limited movement with respect to said bearing support member,
actuating means connected to said bearing support member for moving it and said bearing axially into engagement with said release levers,
whereby said bearing moves said release levers in unison.
2. A clutch assembly according to claim 1 and including:
a second member connected to said bearing,
said flexible means including resilient means interposed between said bearing support member and said second member,
guide means defining a linear axial path for sliding movement of said bearing support member.
3. A clutch assembly according to claim 1 and including:
a second member connected to said bearing,
said flexible means including resilient means interposed between said bearing support member and said second member.
4. A clutch assembly according to claim 1 and including:
guide means defining a linear path for movement of said bearing support.
5. A clutch assembly having a flywheel,
a cover secured to said flywheel,
a pressure plate movably connected to said cover,
a clutch disc interposed between said flywheel and said pressure plate,
a plurality of release levers pivotally connected to said cover and to said pressure plate,
said release levers extending radially inwardly,
a bearing having a surface adapted to engage said release levers,
a bearing support member,
a second member connected to said bearing,
said bearing support member and said second member having adjacent cooperating curved bearing surfaces,
connecting means connecting said bearing support member to said bearing and constructed to support said bearing for limited movement with respect to said bearing support member,
actuating means connected to said bearing support member for moving it and said bearing axially into engagement with said release levers,
whereby said bearing moves said release levers in unison.
6. A clutch assembly according to claim 5 and including:
said connecting means including resilient means interposed between said bearing support member and said second member.
7. A clutch assembly according to claim 5 and including:
guide means defining a linear axial path for sliding movement of said bearing support member.
8. A clutch assembly according to claim 5 and including:
said connecting means including resilient means interposed between said bearing support member and said second member,
guide means defining a linear axial path for sliding movement of said bearing support member.
9. A clutch assembly according to claim 1 and including:
a second member connected to said bearing,
said second member and said bearing support member having adjacent cooperating curved bearing surfaces,
said connecting means including
a plurality of fastening means loosely connecting said bearing support member and said second member,
hat shaped resilient rubber grommets positioned about said fastening means and portions thereof interposed between said bearing support member and said second member.

References Cited

UNITED STATES PATENTS

| | | | |
|---|---|---|---|
| 1,788,864 | 1/1931 | Geistert | 192—110 |
| 1,882,897 | 10/1932 | Reed | 192—110 |
| 2,030,813 | 2/1936 | Dolza | 192—98 |
| 2,061,093 | 11/1936 | Tatter | 192—109 |

MARK NEWMAN, *Primary Examiner.*

A. T. McKEON, *Assistant Examiner.*